Figure 1:
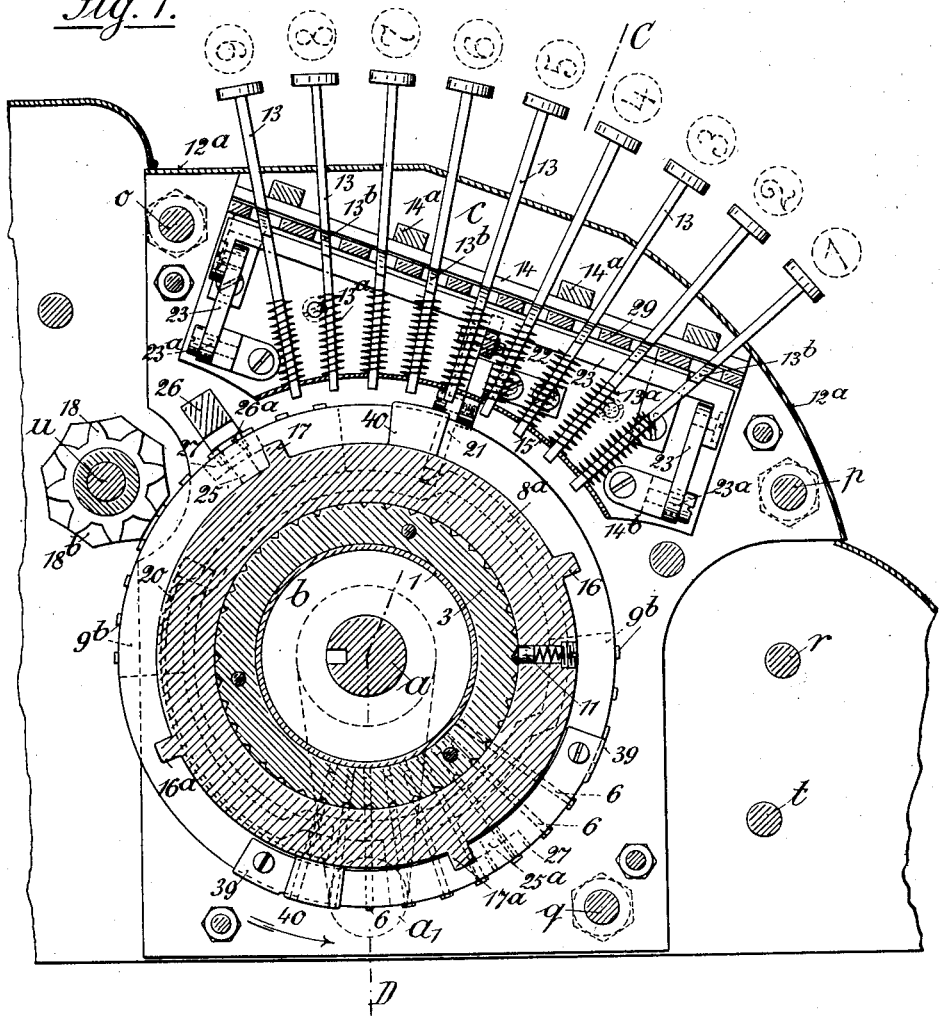

A. BOLLINGER & A. & E. LANDRY.
CALCULATING MACHINE.
APPLICATION FILED DEC. 5, 1907.

944,841.

Patented Dec. 28, 1909.
14 SHEETS—SHEET 1.

Witnesses
William Miller
Christian Almstaedt

Inventors
Alexander Bollinger
Alcide Landry
Eugen Landry
By W. C. Hauff
Attorney A. BOLLINGER & A. & E. LANDRY.
CALCULATING MACHINE.
APPLICATION FILED DEC. 5, 1907.
944,841.
Patented Dec. 28, 1909.
14 SHEETS—SHEET 2.
*Fig. 1ª.*
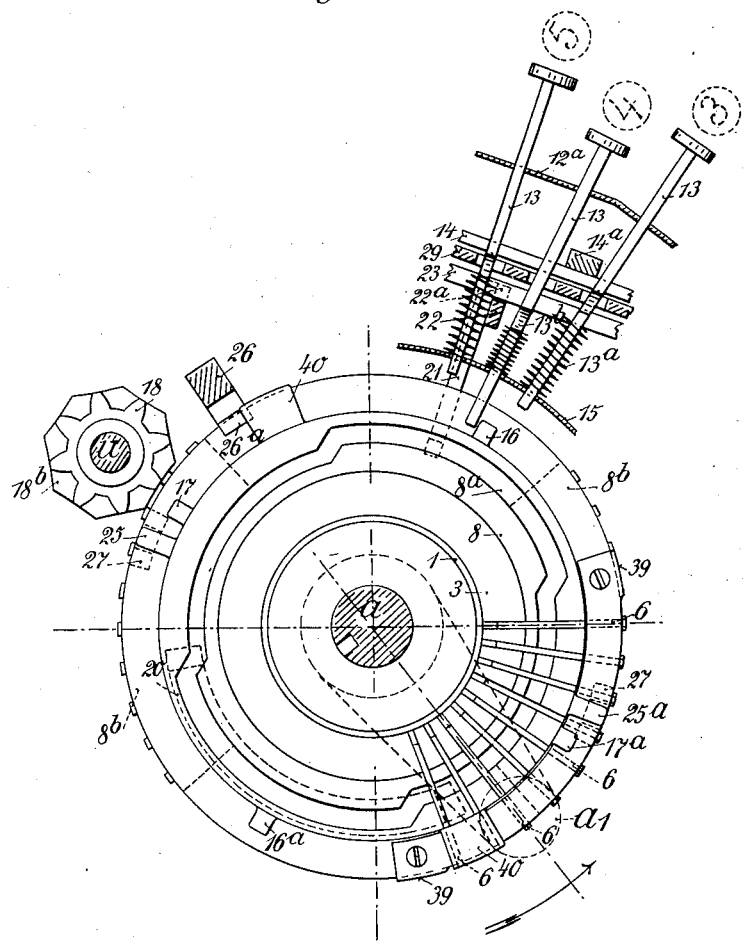
Witnesses
William Miller
Christian Almstaedt
Inventors
Alexander Bollinger
Alcide Landry
Eugen Landry
By W. C. Hauff
Attorney A. BOLLINGER & A. & E. LANDRY.
CALCULATING MACHINE.
APPLICATION FILED DEC. 5, 1907.
944,841.
Patented Dec. 28, 1909.
14 SHEETS—SHEET 3.
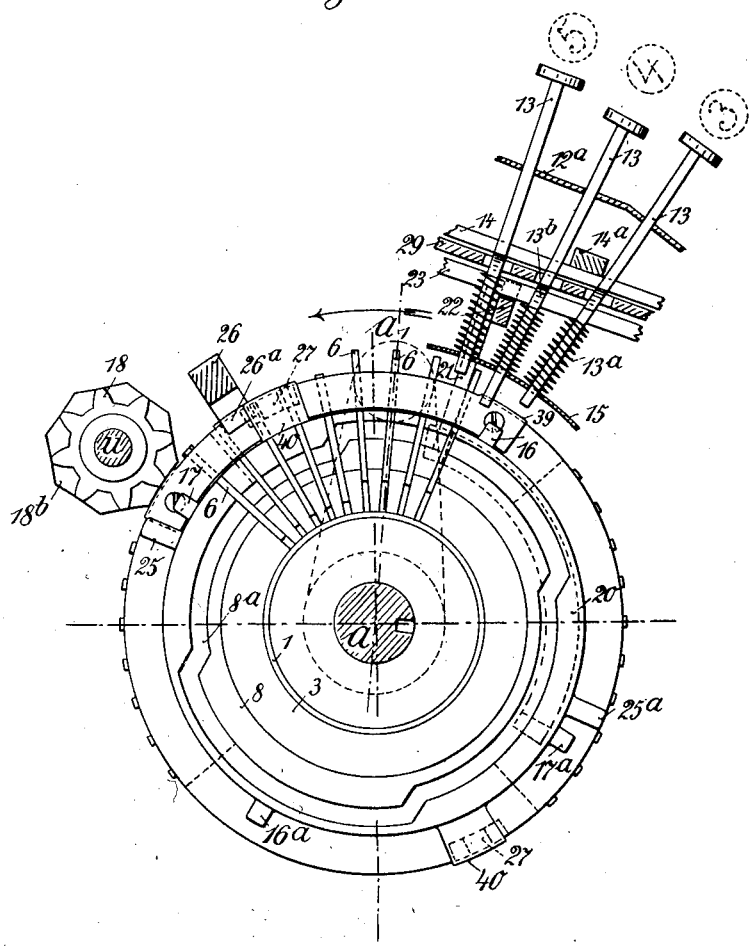
Fig. 1ᵇ.
Witnesses
William Miller
Christian Almstaedt
Inventors
Alexander Bollinger
Alcide Landry
Eugen Landry
By W. C. Hauff
Attorney

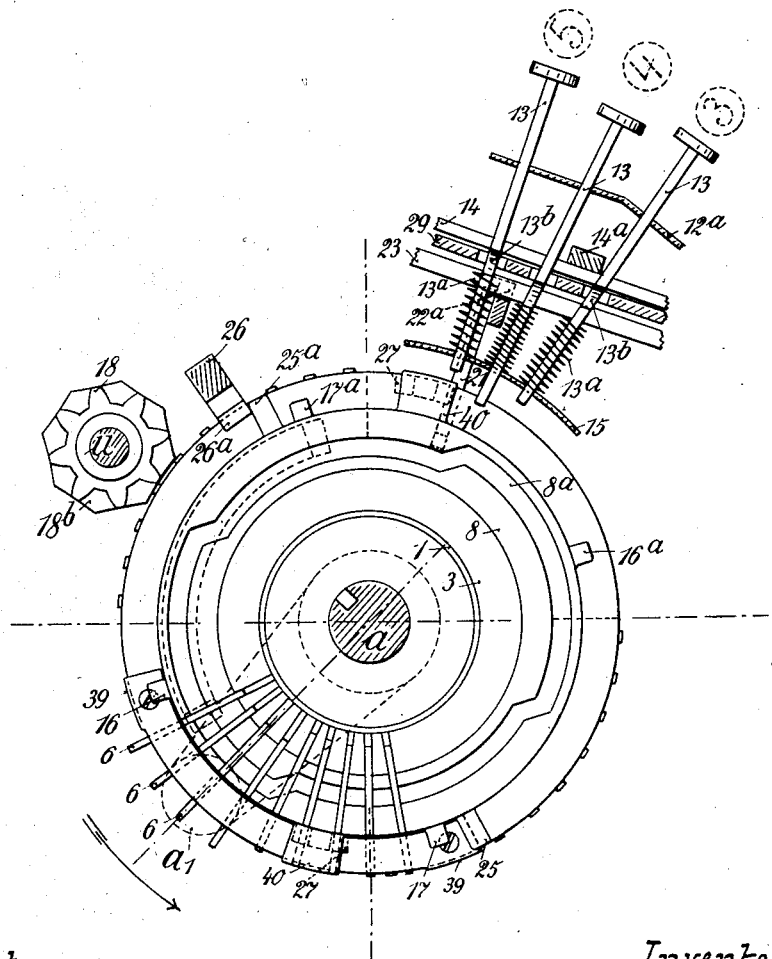

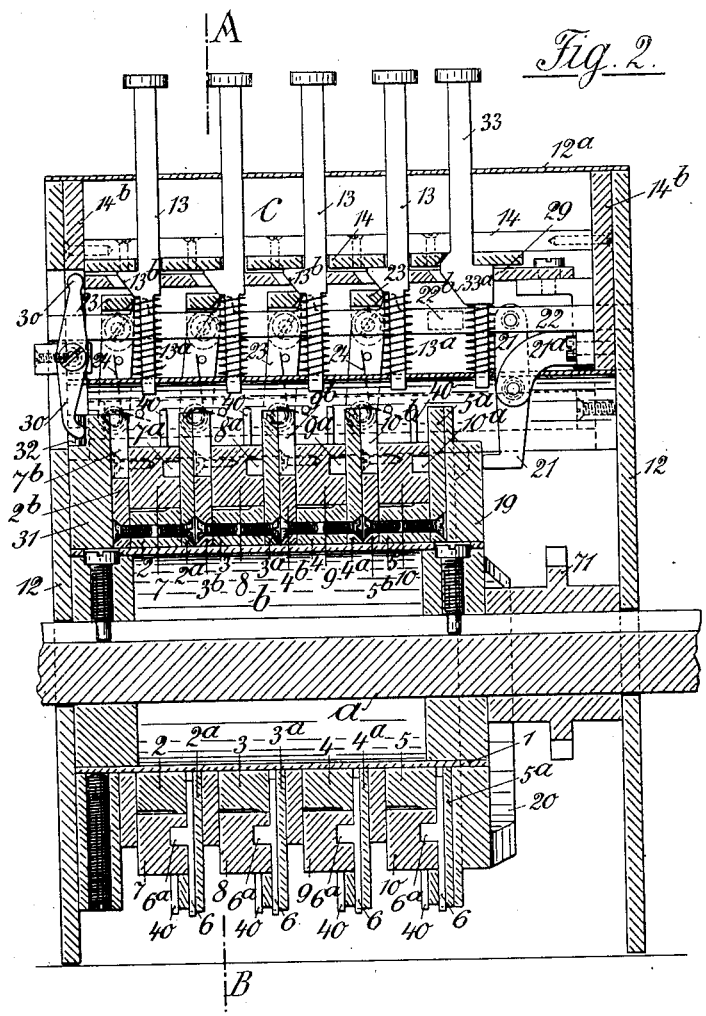
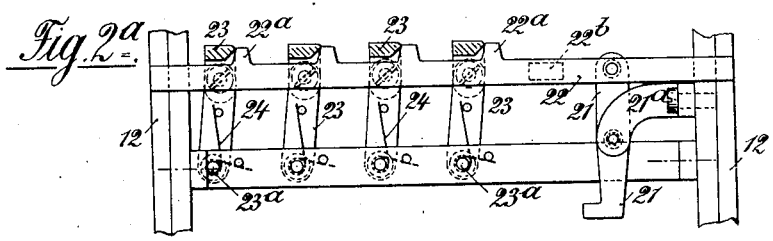

A. BOLLINGER & A. & E. LANDRY.
CALCULATING MACHINE.
APPLICATION FILED DEC. 5, 1907.
944,841.
Patented Dec. 28, 1909.
14 SHEETS—SHEET 6.
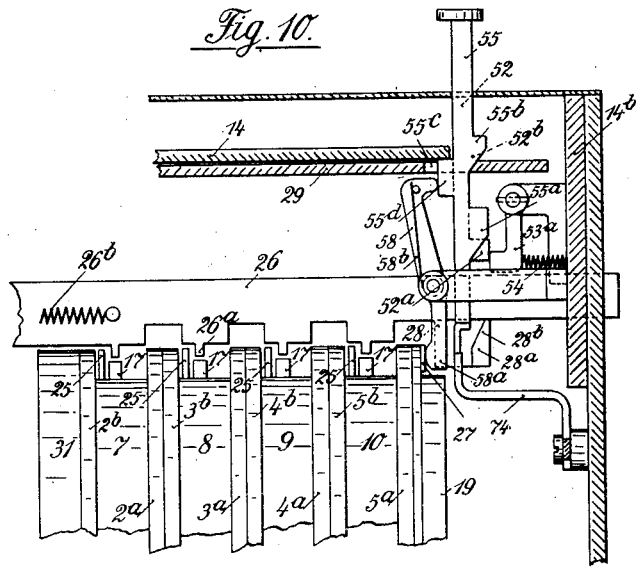
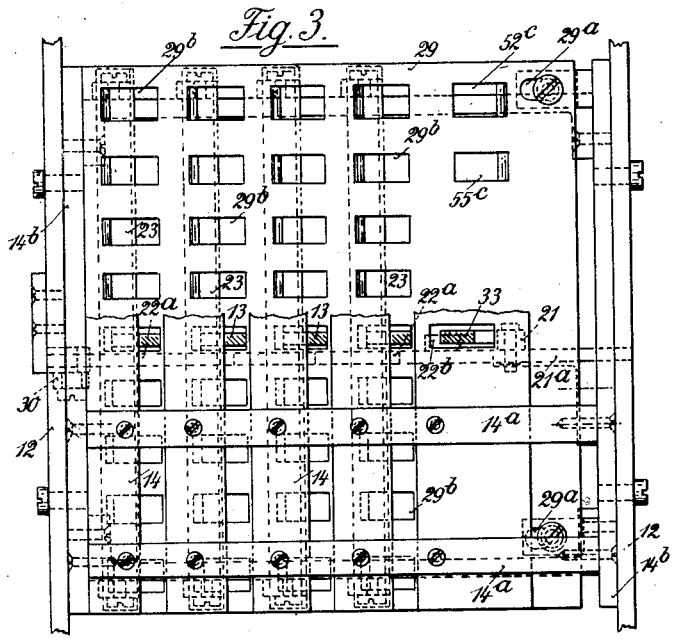
Witnesses
William Miller
Christian Almstaedt
Inventors
Alexander Bollinger
Alcide Landry
Eugen Landry
By W. C. Hauff
Attorney

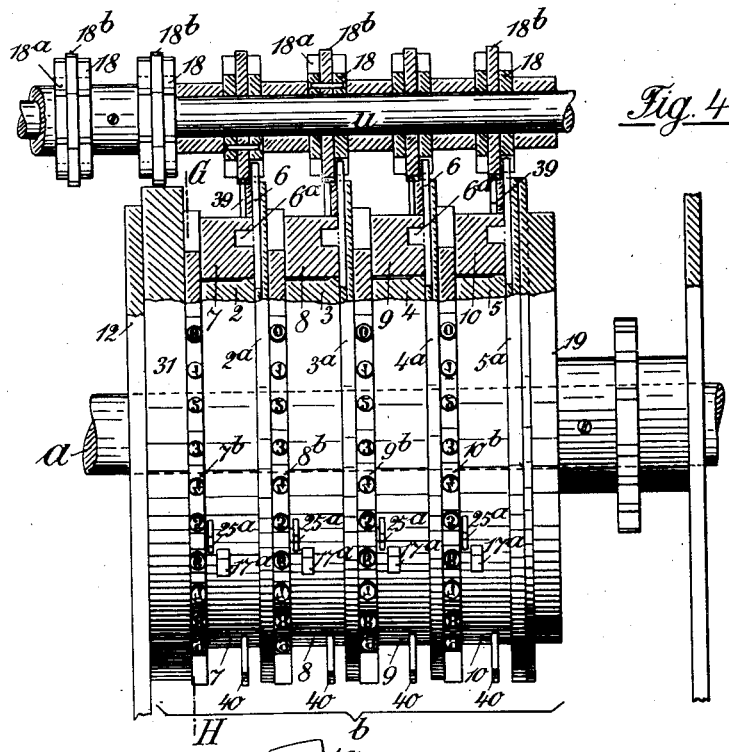

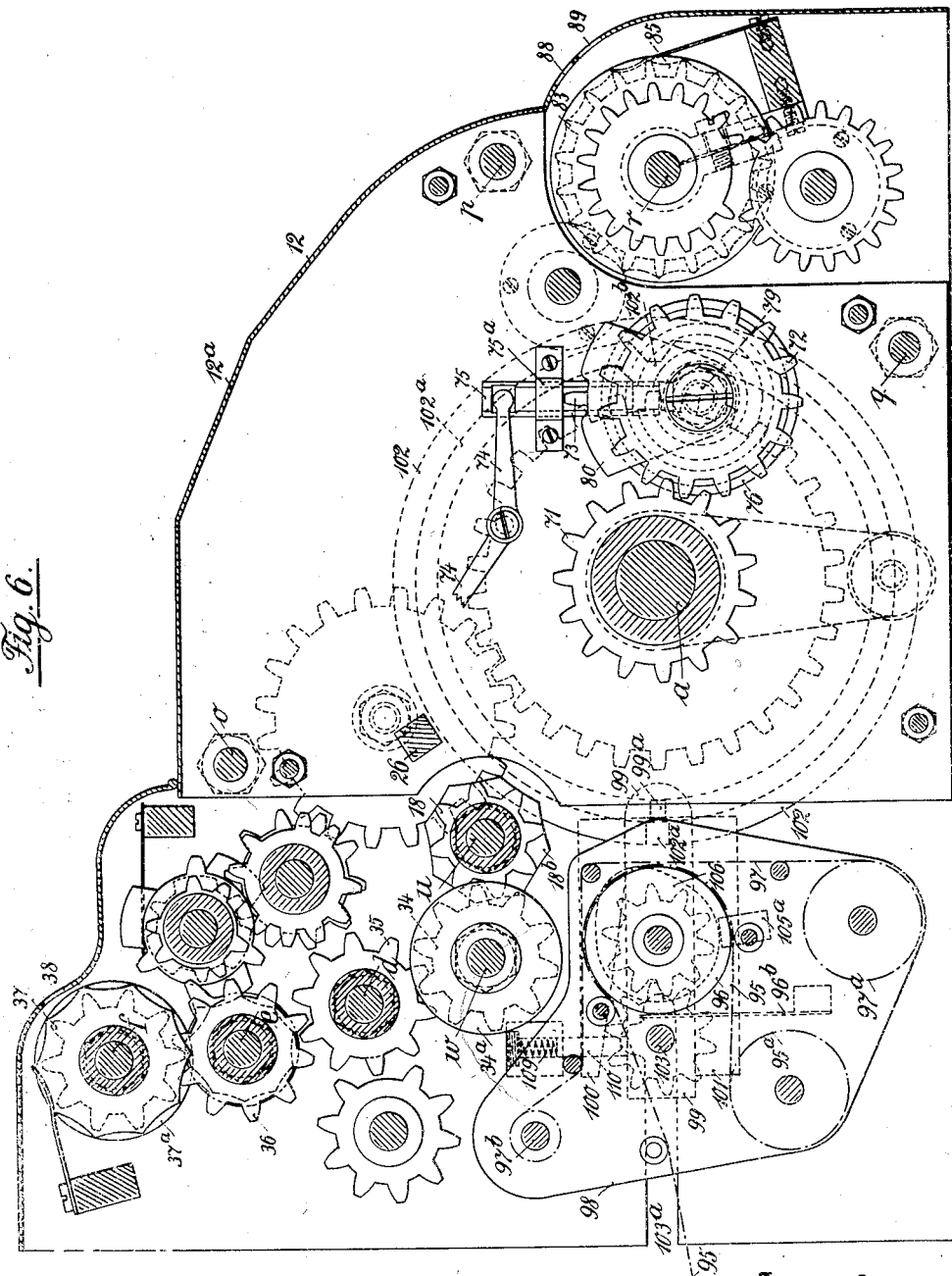

A. BOLLINGER & A. & E. LANDRY.
CALCULATING MACHINE.
APPLICATION FILED DEC. 5, 1907.
944,841.
Patented Dec. 28, 1909.
14 SHEETS—SHEET 9.
Fig. 6ª. 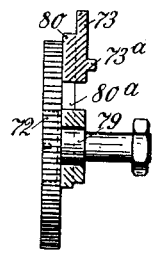 Fig. 6ᵇ. 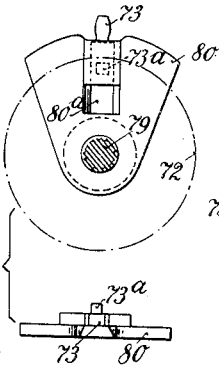 Fig. 6ᶜ.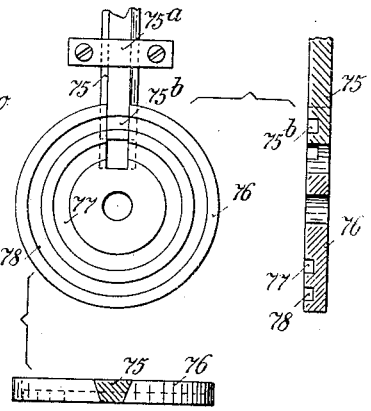
Fig. 9.
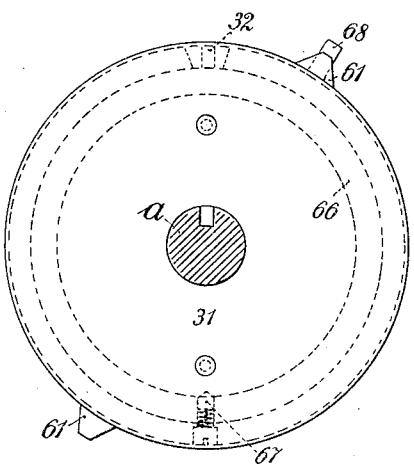
Witnesses
William Miller
Christian Almstaedt
Inventors
Alexander Bollinger
Alcide Landry
Eugen Landry
By W. C. Huff
Attorney A. BOLLINGER & A. & E. LANDRY.
CALCULATING MACHINE.
APPLICATION FILED DEC. 5, 1907.
944,841.
Patented Dec. 28, 1909.
14 SHEETS—SHEET 10.
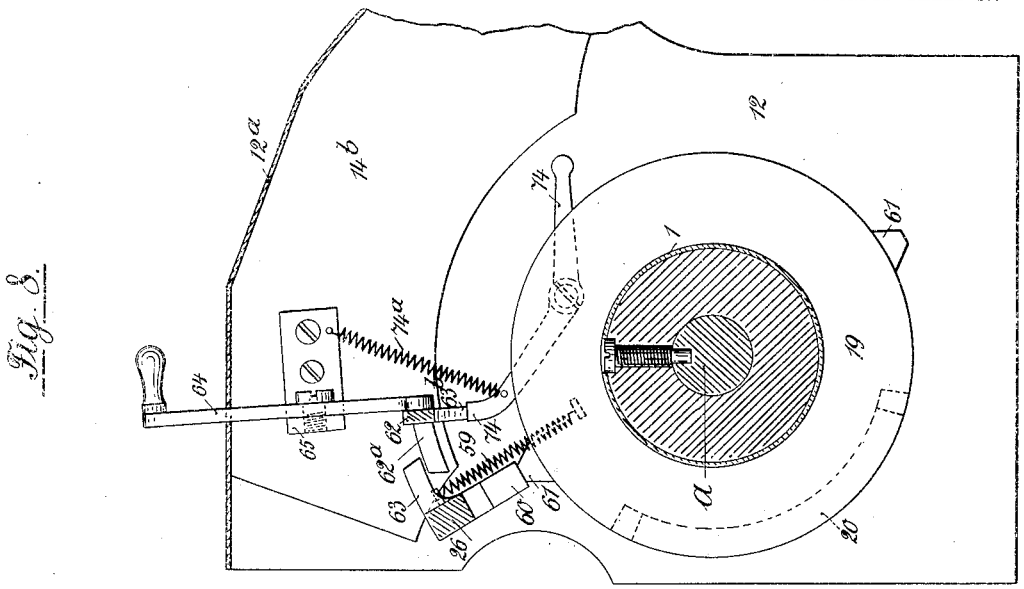
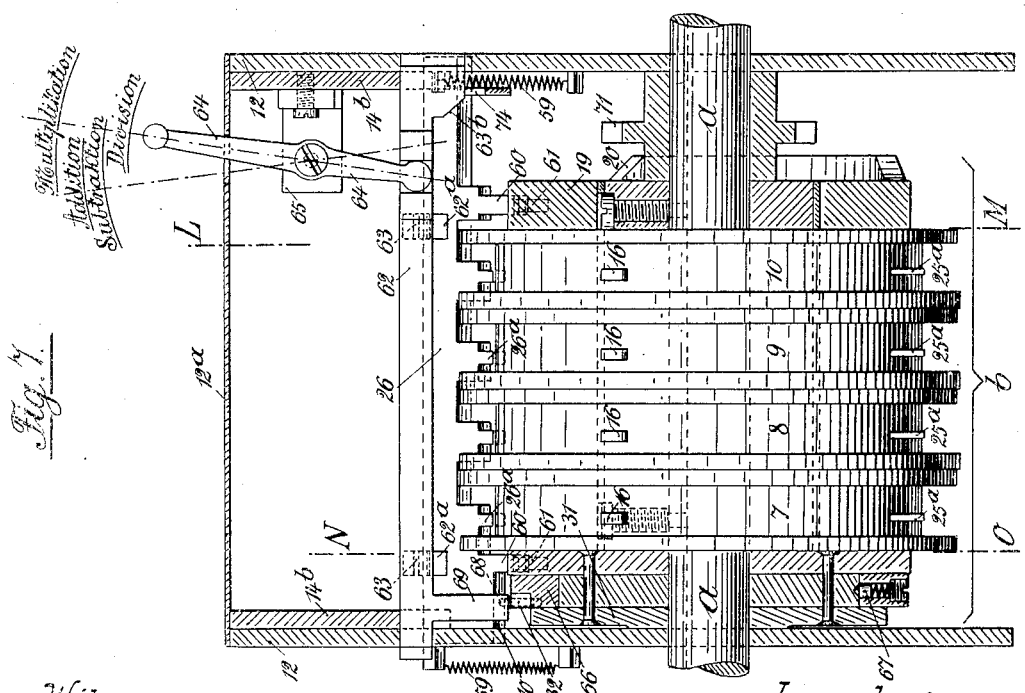
Witnesses
William Miller
Christian Almstaedt
Inventors
Alexander Bollinger
Alcide Landry
Eugen Landry
By W. C. Hauff
Attorney A. BOLLINGER & A. & E. LANDRY.
CALCULATING MACHINE.
APPLICATION FILED DEC. 5, 1907.

944,841.

Patented Dec. 28, 1909.
14 SHEETS—SHEET 11.

Witnesses
William Miller
Christian Almstaedt

Inventors
Alexander Bollinger
Alcide Landry
Eugen Landry
By W. C. Hauff
Attorney

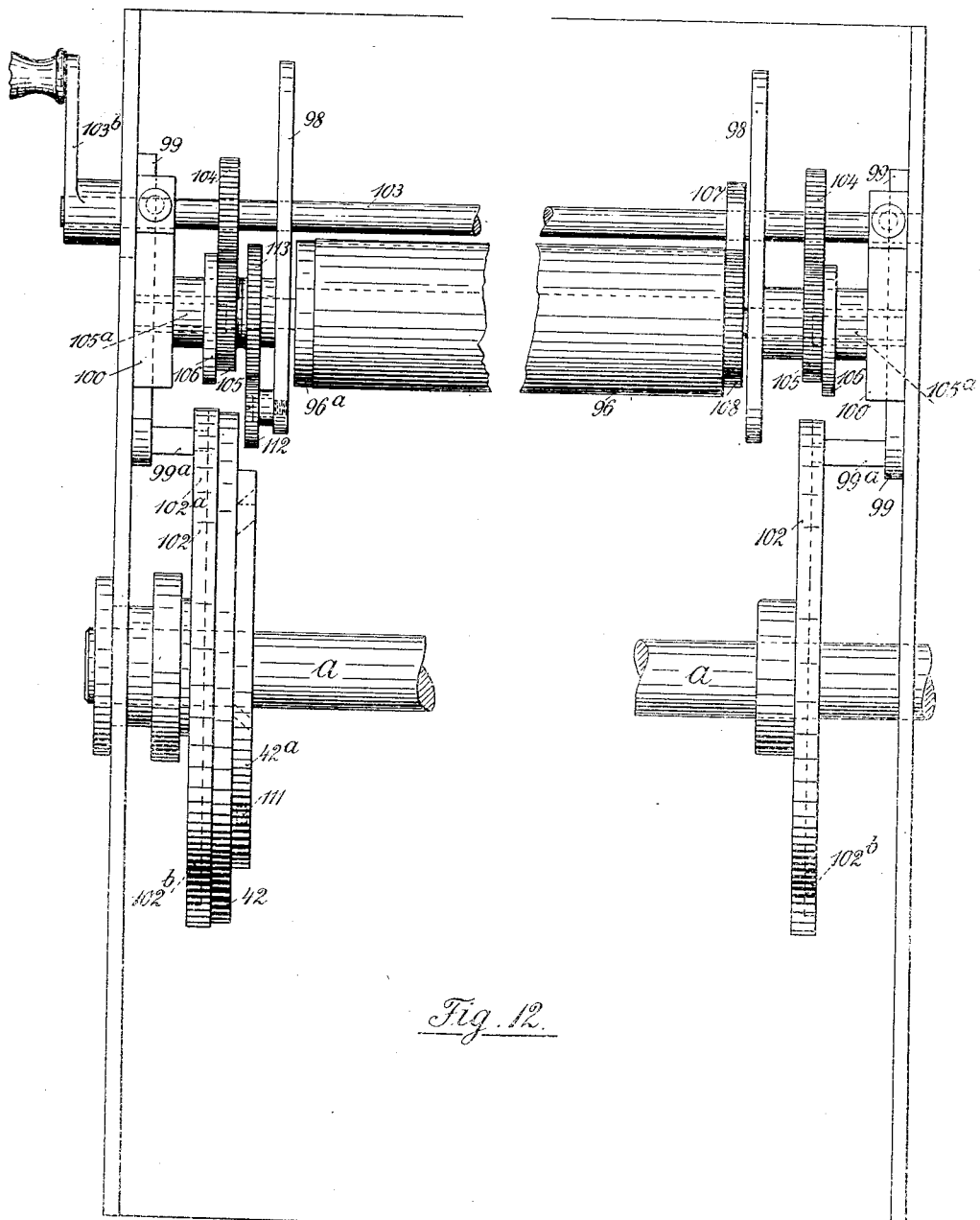

A. BOLLINGER & A. & E. LANDRY.
CALCULATING MACHINE.
APPLICATION FILED DEC. 5, 1907.

944,841.

Patented Dec. 28, 1909.
14 SHEETS—SHEET 13.

Fig. 73.

Witnesses:
William Miller
Christian Almstaedt

Inventors:
Alexander Bollinger
Alcide Landry
Eugen Landry
By W. C. Hauff
Attorney A. BOLLINGER & A. & E. LANDRY.
CALCULATING MACHINE.
APPLICATION FILED DEC. 5, 1907.
944,841.
Patented Dec. 28, 1909.
14 SHEETS—SHEET 14.
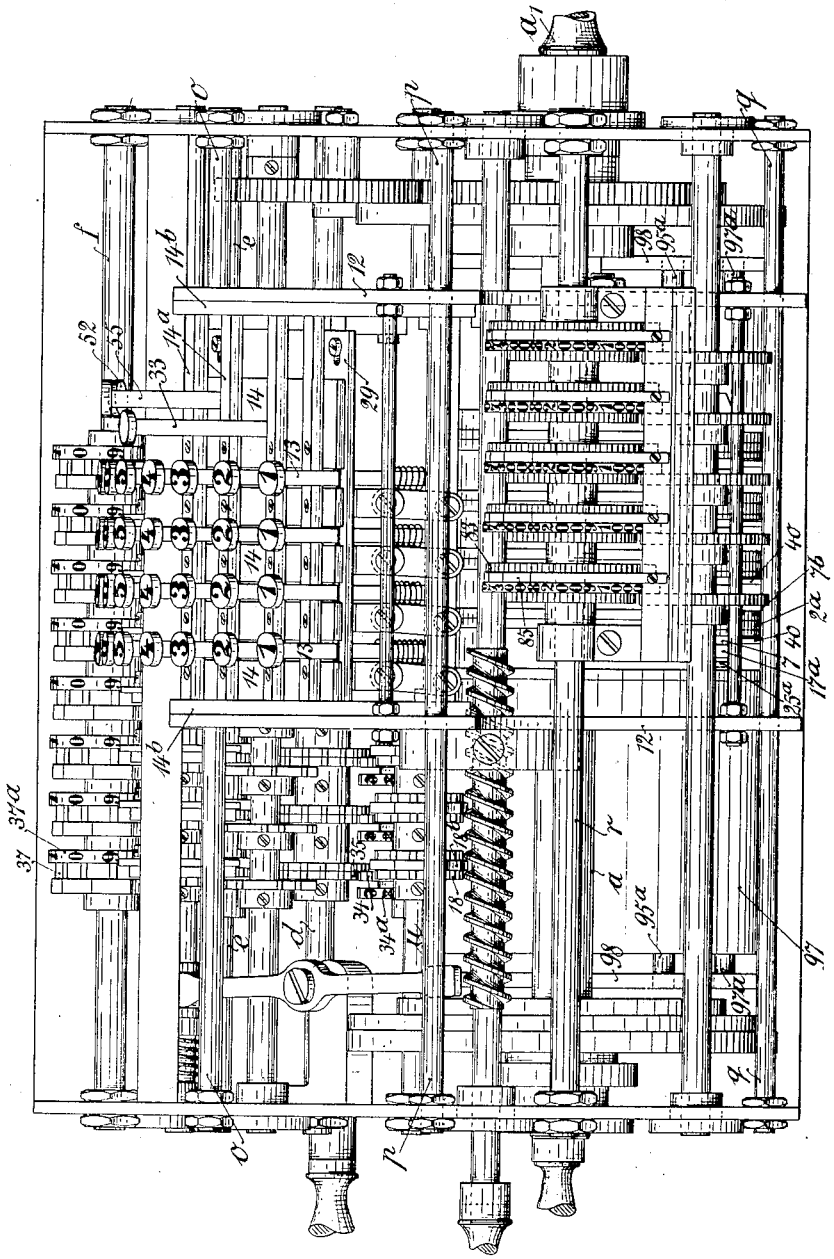
Witnesses:
William Miller
Christian Almstaedt
Inventors:
Alexander Bollinger
Alcide Landry
Eugen Landry
By W. C. Hauff
Attorney

UNITED STATES PATENT OFFICE.

ALEXANDER BOLLINGER, ALCIDE LANDRY, AND EUGEN LANDRY, OF GENEVA, SWITZERLAND.

CALCULATING-MACHINE.

944,841.  Specification of Letters Patent.   Patented Dec. 28, 1909.

Application filed December 5, 1907.   Serial No. 405,270.

*To all whom it may concern:*

Be it known that we, ALEXANDER BOLLINGER, ALCIDE LANDRY, and EUGEN LANDRY, residing at Geneva, Switzerland, have invented new and useful Improvements in Calculating-Machines, of which the following is a specification.

Our invention relates to improvements in calculating machines. In machines of this class having radially moving teeth for setting the figures, mechanism has already been employed whereby the partial rotation of the grooved disk cam for adjusting the teeth is effected by press-keys. With such a machine, however, only addition and multiplication, but not subtraction and division, can be performed.

The subject of the present invention is a calculating machine of this type, with which all four species of calculation can be rapidly carried out with absolute accuracy. In adding and subtracting, the figures of the calculation to be made are at the same time printed upon a traveling paper ribbon, so that they can be examined and checked. In like manner, the result of any calculation whatever can be printed on the ribbon.

The novel features of our improved machine consist essentially in the employment of a rotary ring, detachably connected with the setting wheel and whose groove at two diametrically opposite quarters of the circle lies farther from the axis than at the other two quarters. This ring replaces the ordinary grooved disk and adjusts the teeth by the ring, during a rotation of the main shaft, being arrested by a depressed key of the figure key mechanism, located above the setting mechanism, until the key locking devices are disengaged; while the teeth with the setting wheel are rotated farther by the main shaft, and set the counting mechanism in rotation, and then, when the machine is adjusted for addition and subtraction, by renewed arrest of the grooved ring are returned to the zero position. In order, in making an addition or subtraction to enable printing of the figures of the calculation to be made, figure-segments are provided on the groove rings, and behind the setting mechanism there is located a printing device in connection with the main shaft.

The new machine is illustrated in the accompanying drawings.

Figure 11:
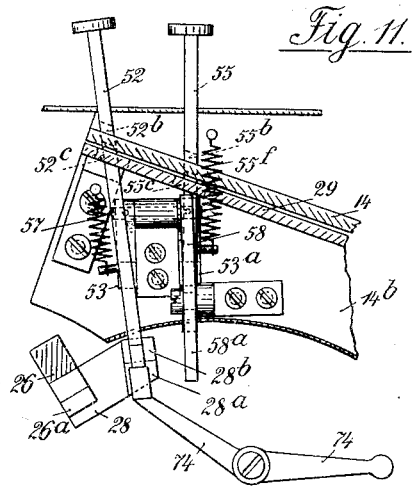
Figure 11A:
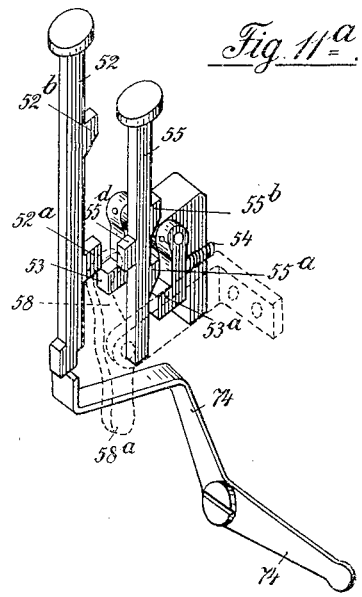
Figure 12A:
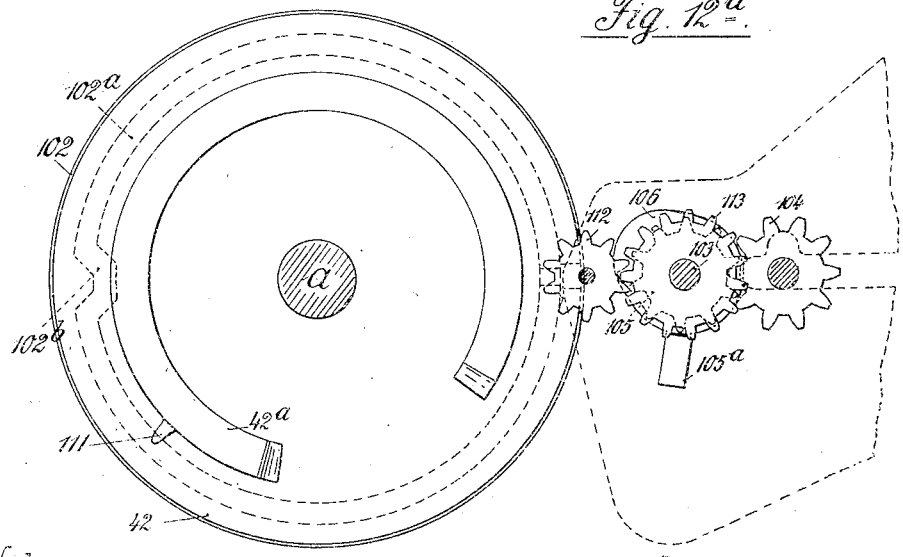

Figure 1 is a cross section, taken on the line A—B of Fig. 2 and Fig. 2 is a longitudinal section on the line C—D of Fig. 1 of the setting wheel drum and key mechanism. Figs. 1$^a$, 1$^b$, 1$^c$ show in several positions a setting wheel with the main shaft. Fig. 3 is a plan of the key locking plate. Fig. 4 is a plan (partly in section) of the setting wheel drum. Fig. 5 is a section on the line G—H of Fig. 4. Fig. 6 is a cross section through the machine. Figs. 2$^a$, 6$^a$, 6$^b$, 6$^c$ and 7, 8, 9, 10 and 11 show details to be hereinafter referred to. Fig. 11$^a$ is a perspective view of parts of Fig. 11, to be subsequently described. Fig. 12 is a plan of the printing mechanism alone. Fig. 12$^a$ shows the driving gear of the printing cylinder. Fig. 13 is a plan view of a calculating machine embodying this invention. Fig. 14 is a front view of Fig. 13.

On the main shaft $a$ there is slidably but not rotatably mounted the setting wheel drum $b$, to whose cylinder 1 the setting wheels 2, 3, 4, 5 are rigidly connected. Each of these wheels is furnished with nine teeth 6 sliding in radial slots and receiving guidance from grooves provided in the disks 2$^a$, 3$^a$ which are rigidly secured to the setting wheels. On each setting wheel there are also rotatably arranged rings 7, 8, 9, 10 which, however, are held by spring actuated pins 11 (Fig. 1), whose conical ends snap into recesses in the periphery of the setting wheels. These recesses are spaced to correspond with the teeth 6. Each ring has a lateral groove 7$^a$, 8$^a$, 9$^a$, 10$^a$ running around it, into which studs or projections 6$^a$ on the teeth 6 project, and which at two diametrically opposite quarters of the circle lies farther from the center of the shaft $a$ than at the other two quarters. These grooves 7$^a$—10$^a$ thus form so called eccentric or cam grooves. Thus supposing the grooved ring were to be held stationary during an entire revolution of the setting wheel, the teeth 6 would be twice pushed forward beyond the edge of the disks 2$^a$, 3$^a$, 4$^a$, 5$^a$ and then back again. For guiding the grooved rings 7—10 annular disks 2$^b$, 3$^b$, 4$^b$, 5$^b$ are provided secured to the setting wheels, and on these disks 2$^b$—5$^b$ there turn two diametrically opposed quadrant pieces 7$^b$, 8$^b$, 9$^b$, 10$^b$ secured to the grooved rings 7—10. The periphery of these quadrants 7$^b$—10$^b$ is marked with the figures 0 to 9 (Fig. 5). In the position of the quadrants and remaining members of the setting wheel drum illustrated in Fig. 1, the figures 0 of the two quadrants lie diametrically opposite on a horizontal line drawn through the center of the shaft $a$. This is the zero position of the setting wheel drum.

Above the setting wheel drum $b$ there is located a key mechanism $c$, which is mounted in a common housing with the drum $b$ between the side-walls 12. The key mechanism, therefore, slides with the setting wheel drum on the shaft $a$ and is guided by the rods $o$, $p$, $q$ (Figs. 1 and 6) secured to the side-walls 12. In the particular construction of the machine illustrated there are four rows of keys 13 provided, corresponding with the four setting wheels and marked on their heads with the numerals 1 to 9. The keys are guided in the top wall $12^a$ of the housing, their lower ends passing through the curved plate 15. They are maintained in their normal, elevated position by springs $13^a$ which press the noses $13^b$ of the keys against bars 14 secured to the cross rails $14^a$. These latter and the bars 14 constitute with the walls $14^b$ a special frame, which is set in the housing or case 12 of the machine.

At the head 19 of the drum $b$ there is provided a lateral, arc-shaped rib 20 having inclined end-faces, in whose path of rotation there lies one end of a double-armed lever 21 fulcrumed to a bracket $21^a$, its other end being pivoted to a toothed bar 22 (see detail view Fig. $2^a$). The teeth $22^a$ of the bar 22 take in front of the yokes 23, which can oscillate to a limited extent on the pins $23^a$ and which are always held to the teeth $22^a$ by springs 24, whereby at the same time the free end of the lever 21 is kept constantly pressed against the head 19 of the drum $b$. Each yoke 23 also lies in front of the whole of the keys of a row, its position being below the noses $13^b$ of the keys when the latter are in their normal, elevated position (Figs. 1 and 2). The yokes serve to lock the keys in depressed position, being forced back by the chamfered edge of the noses $13^b$ on depression of the keys and then snapping forward above these noses owing to the action of the springs 24.

By depression of the keys 13, the latter are brought into their operative position, that is to say, with their tail ends in the path of rotation of projections 16, $16^a$, 17, $17^a$ on the grooved rings 7, 8, 9, 10 of the drum $b$, so that, depending upon the direction of rotation of the shaft $a$, the ring 7, 8, 9, or 10 will be arrested by one of the projections 16, 17 or $16^a$, $17^a$ striking the depressed key. On further rotation of the shaft $a$ the setting wheel 2, 3, 4, or 5 will continue its revolution since the spring actuated stud 11 will be pressed back out of the recess in which it lies. When the studs $6^a$ of the teeth 6 of the rotating wheel reach an outer portion of the groove $7^a$, $8^a$, $9^a$ or $10^a$, these teeth will be protruded in radial direction, while those teeth 6 whose studs $6^a$ enter the inner portion of the groove will be retracted. The rings 7—10 also present two elevations 25, $25^a$, which likewise serve to arrest the rings 7—10 by contacting with a bar 26, which can be either reciprocated in the direction of length of the drum $b$ or radially of the latter, as will be hereinafter explained.

With the above-described construction of the setting wheel drum and the key mechanism, by a rotation of the shaft $a$ the figures of each setting wheel which are indicated by the depressed key of the corresponding row can be transferred to the counting and indicating mechanism by the appropriate partial rotation of the corresponding wheels 18, effected by the protruded teeth 6. We will explain this by means of an example taking for instance, the case of the setting wheel 3, whose office it is on depression of the key whose head is marked "4", to transfer this number of figures, viz. four. The crank $a_1$ for turning the shaft $a$, when in the zero position occupies the position shown in Fig. 1. When rotated toward the right (which in the side view Fig. 1 appears to be a left hand rotation) the grooved ring 8 will at first revolve with the wheel 3, until on the position shown in Fig. $1^a$ being reached the projection 16 reaches the depressed key 13 marked "4", whereupon the ring 8 is arrested. Until the completion of a semi-rotation, or approximately such, of the crank $a_1$, that is, until the position shown in Fig. $1^b$ is reached, the teeth 6 will have been protruded from the wheel 3 and some of them retracted again, in consequence of the studs $6^a$ passing through the outer quarter groove $8^a$. And the arrangement is such that the number of the teeth 6 which remain in the protruded position is the same as the number (in the present case 4) which is marked on the depressed key. This is brought about by the arc-shaped rib 20 after nearly a semi-rotation releasing the depressed key and thus setting free the ring 8. In the position shown in Fig. $1^b$ this has just occurred. The teeth 6, in consequence of the rigid connection of the setting wheels, with the shaft $a$, have, in the position shown in Fig. $1^b$, like the crank also been turned through nearly half a revolution; the ring 8, however, has only covered a distance whose length is determined by the depressed key. The outer quarter groove has thus been shifted relatively to the setting teeth 6, in such manner that on completion of the half rotation of the crank there remain as many teeth in the outer portion of the groove (that is, in protruded position) as the number on the depressed key indicates; while the remaining teeth have again receded into the inner portion of the groove $8^a$, that is to say, the portion lying nearer to the center of the shaft $a$. In the example under consideration, therefore, four teeth remain protruding in Fig. $1^b$, which teeth, on further rotation of the crank, effect advance of the wheel 18 through the distance of four teeth. In order, during the second half rotation of the crank, to retract the protruded teeth again the grooved ring 8 and setting wheel 3 are again shifted relatively to each other, to such extent that on completion of this second half rotation of the crank the ring 8 has executed a semi-rotation relatively to the position shown in Fig. 1. This further shifting is attained by the elevation $25^a$ which strikes a nose $26^a$ of the bar 26, as is shown in Fig. $1^c$, and which projection arrests the ring 8 until the protruding teeth, rotating with the setting wheel, have left the outer portion of the groove and entered the inner portion, lying nearer to the center of the shaft $a$, so that they have been retracted again. This is the case when the crank $a_1$ has covered the path from the position illustrated in Fig. $1^c$ to the position shown in Fig. 1, in which the zero position of the setting wheel drum has been reached again, except that the quadrant-piece marked with the numerals 0—9 and lying to the left of Fig. 1 is now replaced by the opposite quadrant-piece.

In order that the ring 8 may be released at $25^a$ immediately the crank has reached the position shown in Fig. 1, there is provided, preferably on the head 19 of the drum, a cam 27, in whose path of rotation there lies a projection 28 of the bar 26 and which as shown in Fig. 10, shifts this bar by means of the projection 28 until the noses $26^a$ are forced sideward of the elevation $25^a$. The cam 27 is so located relatively, to the crank that it will have effected the lateral shifting of the bar 26 by the time the crank has reached the position shown in Fig. 1. On the following rotation of the shaft $a$, the partial rotation of the wheel 18 corresponding to the key depressed is effected in the same manner, except that the opposite half of the ring 8 now comes into operation during its semi-rotation, and the projections $16^a$ and 25 will cause two arrests. In order that the motion of the toothed bar 26 which brings the noses $26^a$ out of the path of the elevations 25, $25^a$ may also take place during the second half rotation of the shaft $a$, two cams 27 are provided, located at diametrically opposite parts of the disk 19. Thus those grooved rings which are not to be arrested by a depressed key and must thus make a complete rotation find free passage for the elevations 25, $25^a$ past the toothed bar 26.

The direction of rotation for operation of the drum and key mechanism as above described is that necessary for adding and multiplying with the machine. On reverse, that is, left hand rotation of the crank $a_1$, such as is necessary for subtraction and division, the figures indicated by the depressed keys are transferred in like manner by protrusion of the teeth 6; the arrest of the grooved rings then takes place, within a full left-hand rotation of the crank $a_1$, at first by means of the projections 17 and then by the projections $25^a$, which strike the noses of the bar 26 as before, but this time from the left, and bring about further shifting of the grooved rings and setting wheels relatively to each other, while previously the disengagement of the depressed keys, that is, release of the grooved rings at 17 by the arc-shaped rib 20 and lever 21, has taken place from the right.

For the purpose of locking the keys in the elevated position, so that they can not be depressed during rotation of the crank $a_1$, there is provided in the key frame, below the bars 14 a sliding plate 29 (Fig. 3), whose slots $29^a$ receive guide-pins. This plate 29 presents rows of apertures $29^b$, one for each key. At each aperture $29^b$ the wall which lies opposite the chamfered nose $13^b$ of the key is correspondingly inclined, so that when the two chamfers abut, descent of the key is impossible. The necessary shifting of the plate 29 toward the noses $13^b$ is effected automatically by means of a double armed lever 30, which lies against the edge of the plate 29, while its other arm hangs before the head 31 of the drum $b$. In the drum head 31 there is a recess 32, whose two side walls are chamfered, and in which the lever arm 30 lies when the crank $a_1$ occupies the position shown in Fig. 1. The plate 29 is now in the position shown in Fig. 2, in which the chamfered edges of the apertures $29^b$ are at such distance from the noses of the keys that the latter can be depressed. Immediately the crank $a_1$, however, has made a slight rotation, the lever 30 leaves the recess 32 and lies in front of the face of the drum head 31, whereby the lever is oscillated and shifts the plate 29 so as to cause the chamfered edge of the apertures $29^a$ to come below the noses $13^b$ and thus lock the keys. The depressed keys on being disengaged by the toothed bar 22 first ascend so far that the noses $13^b$ strike the bottom of the locking plate 29 (Figs. $1^b$, $1^c$) and only ascend to their highest position after the crank has made a complete rotation, into the position shown in Fig. 1. The retention of the keys in the intermediate position is of importance, as in this manner it is indicated to the calculator that the setting mechanism is in the operative position. Moreover the figure set is in this way displayed to him until the completion of the operation. In this manner errors are avoided such as might easily occur, were the keys to return directly from the lowest to the highest position before the operation has been completed for the number set. The return of the plate 29 into the position shown in Fig. 2, when the lever 30 again enters the recess 32, is effected by a spring acting on the plate at a suitable place.

It may happen that in setting the units the wrong keys are depressed; in order in such event to avoid having to turn the crank $a_1$ in order to disengage such keys again, a supplementary correction-key 33 (Fig. 2) is provided. This key has a chamfered projection $33^a$ which acts upon a lug $22^b$ on the toothed bar 22, in such manner that on depression of the key 33 the bar is pushed toward the yokes 23. This causes the teeth $22^a$ to force the yokes sideward to a corresponding extent, so that they release the noses $13^b$ of the depressed keys, which now snap up under the action of the springs $13^a$.

The figures are transferred by the trains of wheels (Fig. 4) 18, $18^a$, 34, 35, 36, 37 (Fig. 6) mounted on the shafts $u, w, d, e, f$ respectively, to the numeral disks $37^a$ connected with the wheels 37, the numerals being visible through the windows 38 in the top of the machine case. In order to prevent unintentional further rotation of these wheels, locking disks $18^b$ are connected with the wheel 18 (Fig. 1) and on the disks $2^a$ $5^a$ of the setting wheels 2—5 two locking-pieces 39 are provided, in such position that one of them is always before and the other behind the teeth 6. In the drawing the locking-pieces are secured to the arc-shaped plate attached to the side of the disks $2^a$—$5^a$ and which serve to guide the teeth 6. The grooved rings 7—10 also possess peripheral stops 40 which are located immediately in front of the outer quarters of the groove $7^a$—$10^a$, so that at the commencement and end of the protrusion of the teeth there is always a locking-piece 39, and one of the stops 40. When, therefore, the figures have been transferred, a locking-piece enters the arc-shaped recess of the locking disk $18^b$ and prevents further rotation of the same and of the corresponding train of wheels. The means for transferring the figures, and the locking-devices, do not however, form any part of the present invention.

For multiplication and division the position of the bar 26 must be altered, so that the noses $26^a$ come beyond the reach of the projections 25, $25^a$ of the grooved rings. This can be effected either by laterally shifting the bar or by turning it in upward direction. Lateral motion can be given to the bar 26, to bring it out of reach of the projections 25, by the cam 27 at the zero position of the setting wheel drum, in the manner already described. In order to hold the bar in this position against the action of the spring $26^b$ (Fig. 10), a key 52 is provided, whose tail end takes in front of a lateral arm $28^a$ projecting from a bracket 28, and having a chamfer $28^b$. In the elevated position of the key 52 and when the noses $26^a$ lie in the path of rotation of the projections 25, the tail end of the key is located above the chamfer $28^b$, so that on depression of the key, the bar 26 is locked by the key. In the depressed position the key 52 is locked by the double pawl 53, $53^a$ (Figs. 10. 11. $11^a$), which are actuated by springs 54, the part 53 of the pawl snapping over a catch $52^a$ on the key 52. The key has also a chamfered shoulder $52^b$, with which, at the aperture $52^c$, it acts upon the plate 29 and on depression causes sliding of the latter, which results in locking of those of the keys 13 which have not been set. In conjunction with the key 52 there is a second key 55, whose office it is to release the key 52 again, in order to disengage the bar 26, so that the key 52 may be drawn up again into its elevated position by the spring 57. To enable this to be done the key 55 is provided with a chamfered shoulder $55^a$, whose inclined edge lies above the protruding part of the double-pawl, so that when the key 55 with shoulder $55^a$ descends, the part $53^a$ is pressed back and the part 53 pushed down by the catch $52^a$ of the key 52. In depression of the key 55 a nose $55^b$ on it comes before the edge of the aperture $55^c$ in the plate 29 and now replaces the key 52 in the operation of locking the plate. At the same time the key 55 itself is held in the depressed position by a double armed pawl 58, the hooked end of the pawl taking over the catch $55^d$ under the action of the spring $58^b$. The other arm $58^a$ of the pawl 58 projects into the path of rotation of the cam 27 of the drum head 19, so that the pawl is released from the catch $55^d$ and the key 55, controlled by the spring $55^f$, disengaged, immediately the cam 27 comes against the pawl arm $58^a$.

Figs. 7, 8 and 9 show a device for effecting alteration of the position of the bar 26 by an up and down motion. The bar is here guided in radial slots in the side or case walls 12, and is drawn toward the drum by spring 59, so that in the lowermost position it lies with its noses $26^a$ in the reach of the projections 25. For the purpose of lifting the bar 26 out of the reach of these projections arms 60 are provided on it, and the drum heads 19, 31 are furnished with cams 61 which take below these arms when the drum is in the zero position. The bar 26 can be locked in the elevated position by a second, longitudinally sliding bar 62, supporting limbs $62^a$ on this bar taking below the arms 63, provided at suitable places on the bar 26. The bar 62 is shifted by turning a hand lever 64, pivoted to the bracket 65, and whose free end projects through an aperture in the covering wall 12ᵃ.

The locking of the keys is effected in this device by means of the lever 30 (Figs. 2), not shown in Figs. 7 and 8. For this lever there is a suitably guided ring 66 (Fig. 7) provided at the drum head 31, said ring being detachably held to the latter by a spring actuated pin. 67. This ring is furnished with the recess 32 for the entrance of the end of the lever 30, and on such entrance as Fig. 2 shows, the keys are released from the sliding plate 29. The ring is also provided at the circumference end with a projection 68. When the bar 26 is brought into the elevated position for multiplication or division and locked by the limbs 62ᵃ on pushing the bar 62 (Figs. 7 and 8), the limb 69 of the bar 62 will lie in the path of rotation of the projection 68, so that the ring 66, on rotation of the crank shaft $a$, will be arrested by the part 68 striking against the part 69. This will result in the recess 32 altering its position relatively to the position of the crank and the keys remain locked until in the zero position of the drum the ring 66 is again brought into the normal position by the projection 68 having struck an enlargement 70 on the bar 26, in the same manner as in the case of the grooved rings 7—10 the noses 26ᵃ were held by the projections 25.

In bringing the drum and the key mechanism into the position for multiplication and division, these parts of the machine act upon the rotations indicating mechanism mounted in the front lower part of the case on the shaft $r$ and indicating the multiplier or quotient. This is done from the main shaft $a$, by means of the gears 71, 72 (Fig. 6) a driving tooth 73 connected with the gear 72, which simultaneously with the adjustment of the bar 26 in the position for multiplication and division, is brought into a protruding position, so that it may, on rotation, mesh with one of the gears 83 of the indicating mechanism on the shaft $r$. For this purpose a double armed lever 74 (Figs. 6, 7, 8) is fulcrumed to the wall 12, the one arm of which, in the form of construction shown in Figs. 10 and 11, takes under the end of the key 52, so that on depression of the key the lever executes a short oscillation. In the form of construction shown in Figs. 7 and 8 this oscillation is caused by the lateral shifting of the bar 62, a chamfer 63ᵇ of the bar passing over the end of the lever 74 and depressing it. The other arm of the lever is connected with a slide 75 (Figs. 6 and 6ᶜ) which works in a guide 75ᵃ on the wall 12, and whose lower end engages in a fast disk 76, provided with two circular grooves 77, 78. In front of this disk there rotates on the pin, 79 secured to the wall 12, the holder 80 for the tooth 73, which slides radially in the slot 80ᵃ and has a stud 73ᵃ, which can enter both the groove 77 and the groove 78 in the disk 76. The necessary shifting of the tooth 73 for this purpose, is caused by the slide 75, which has a groove 75ᵇ (Fig. 6ᶜ) which in the elevated position of the slide lies on a level with the groove 78 and in the depressed position of the same with the groove 77, and which embraces the stud 73ᵃ of the tooth 73 when the crank $a^1$ of the main shaft $a$ occupies the position shown in Figs. 1 and 6, or the setting wheel drum the zero position. The holder 80 is rotated owing to its being originally secured to the toothed wheel 72. If the machine has been set for addition or subtraction, the lever 74 remains in the position produced by the pull of the spring 74ᵃ, in which the slide 75 is moved so far downward that the groove 75ᵇ lies in concentric position with the groove 77 and the tooth 73 therefore in the retracted position, in which it is retained during its rotation, as the stud 73ᵃ rotates in the groove 77. Should the lever 74 oscillate, however, as is the case when the machine is set for multiplication or division, the slide 75 lifts the tooth 73 into the operative position, in which the stud 73ᵃ runs in the outer groove 78.

The holder 80 of the tooth 73 has the edges at each side of the tooth formed as arc shaped or rounded portions, which on rotation in either direction, and after the tooth has effected the described partial rotation of the wheel 83, come into the correspondingly shaped depressions in the locking disk 85 and thus prevent further rotation of the said disk and wheel 83. The shoulders are cut away at each side of the tooth 73 to such extent that the gap admits of the tooth 73 causing the partial rotation of the wheel 83 before the following shoulder locks it.

In performing multiplication, the multiplicand is first set in the key mechanism. Thereupon the bar 26 is brought out of the path of rotation of the projections 25, 25ᵃ of the grooved rings 7, 8, 9, 10. At the same time the driving tooth 73 has come into the reach of one of the gears of the gear wheel 83. The crank of the main shaft $a$ must now be rotated as many times as the multiplier has units in the units place; the number of rotations is then visible in the upper row of windows 88. For carrying the tens of the multiplier the key mechanism must be so shifted that the driving tooth 73 comes within the province of the tens place of the gears of the gear wheel 83, whereupon the main shaft is again rotated as many times as the tens-number contains units. The shifting of the key mechanism occurs as often as there are places in the multiplier. The result is then visible in the windows 38.

In order to perform division with the machine, it is necessary that the drum and indicating mechanisms occupy the zero position. The setting mechanism is first brought into the extreme left hand position. The dividend is then set in the key mechanism and transferred, by the main shaft being turned to the right, to the numeral disk 37$^a$. Thereupon the divisor is set in the key mechanism, the bar 26 is disengaged by depression of the key 52, or by bringing the limb 62$^a$ below the arm 63 of the bar 26, and simultaneously the tooth 73 protruded, in order that it may mesh with the gears 83 of the rotations indicating mechanism. Thereupon the main shaft $a$ must be rotated as many times toward the left as the divisor is contained in the oppositely located places of the dividend, which gives the highest place of the quotient. The setting mechanism is then adjusted from left to right, that is, the tooth 73 is brought into the path of rotation of the next wheel 83 for the second highest place of the quotient. The division of the succeeding places is conducted in the just described manner. The quotient is visible in the window of the lower row 89, while the remainder appears in the window 38.

During the performance of a multiplication or division the keys giving the multiplicand or divisor remain in the middle position (Figs. 1$^b$ and 1$^c$); after the completion of the operation the drum is set to zero by throwing in the toothed bar 26 and giving the crank one turn to zero, whereby the keys are likewise released.

The construction of the machine is such that in adding or subtracting, the numbers of the calculation to be made can be printed, and the result of the calculation, of whatever nature, printed on a continuous paper ribbon. This is done with the aid of printing mechanism, the arrangement of which is shown in cross section in Fig. 6 and in plan in Fig. 12. This printing mechanism consists of a drum 96 for the paper ribbon 95 and of an ink ribbon 97 which is suitably conducted, by means of rollers, above the paper ribbon, that is, the printing drum, and in front of the latter, at a short distance from it, on the main shaft side. The paper ribbon is wound on the drum 95$^a$, while the ink ribbon is wound off the roller 97$^a$ and onto the roller 97$^b$ or vice versa. The drum 96 is mounted between the plates 98, which are held together by the shafts of the guide rollers for the ink ribbon. The shaft of the printing drum 96 is prolonged on each side beyond the plates 98 and its ends are mounted in slides 99, which are secured with capability of sliding between the guides 100, 101 affixed to the machine case. The guides 100, 101 are connected by means of studs 99$^a$ with the grooved disks 102, rigidly mounted on the main shaft $a$. The grooves 102$^a$ of these disks, which receive the studs 99$^a$, have at one part a bend 102$^b$, which bends on rotation of the main shaft $a$, cause reciprocation of the slides 99 and thus a slight oscillation of the drum 96, with the paper ribbon toward the ink ribbon and the shaft $a$. The disk 102 has also a peripheral notch 102$^c$, through which the stud 99$^a$ can pass from the groove 102$^a$ whereby the printing mechanism can be brought out of connection with the disk 102.

The printing drum, when the printing mechanism is set in operation, will at each rotation of the main shaft $a$ be fed forward through a short distance. This is done by means of a tooth 111 (Fig. 12$^a$), which turns with the shaft and is preferably provided on the rib 42$^a$ of the disk 42. This tooth 111 engages in the intermediate gear 112, which meshes with the gear 113, mounted fast on the drum shaft. The printing drum has a brake disk 96$^a$ (Fig. 12) on which bears a spring 96$^b$ (shown in dotted lines in Fig. 6), so that it can not rotate of itself.

In the plates 98 there is mounted another shaft 103, upon which the two gears 104 are secured, which mesh with gears 105, loosely mounted on the shaft of the printing drum, and with each of which there is rigidly connected a cam disk 106. A third gear 107 which sits fast on the shaft 103 is mutilated and engages with a gear 108 mounted fast on the shaft of the drum 96. The printing mechanism is thus partly mounted on the slides 101 and partly on the shaft 103 in slots 103$^a$ in the wall of the machine case and so arranged that the printing drum lies below the shaft $w$ and on a level with the main shaft $a$ and in front of the numeral quadrant-pieces 7$^b$. On advance of the printing drum by the disk 102, with its grooves 102$^a$, therefore, the number on the numeral quadrant opposite the printing drum will be printed upon the paper ribbon by the ink band and paper being pressed against this quadrant. Connected with the gears 34, which turn loosely on the shaft $w$, there are numeral disks 34$^a$, which correspond with the numeral disks 37$^a$ mounted on the shaft $f$, in front of the windows 38, and which are so located that the same number which appears in the window 38, lies on the numeral disks 34$^a$ in the line connecting the center of the printing drum with the center of the shaft $w$. The printing drum then occupies the position shown in Fig. 6, in which the pins 99$^a$ are located in the round part of the grooves 102$^a$ and thus at a distance from the shaft $a$. The numerals of the result visible in the windows 38 at the same time stand on the numeral disks 34$^a$ above the printing drum 96. In order now that these numerals, that is, the result, may likewise be printed on the paper ribbon of the drum 96, the latter is caused to make an upward movement to such extent that the drum with the paper ribbon and the ink ribbon is pressed against the numerals in question of the figure disk 34ª. The upward motion of the drum 96 is caused by the cams 106, which being rotated by the gears 104, 105, by means of the crank 103ᵇ, pass over the projections 105ª, secured to the walls of the case and in doing so lift the drum. On such raising of the drum the slides 99 move slightly upward, for which reason the top guides 100 are correspondingly chamfered. In the side walls of the machine case, above the shaft 103, short slots are also provided in which the said shaft can slide on ascent of the drum. In order that the slides 99 may receive guidance in the non-raised position, adjustable pins 110 are furnished above it in the guide-pieces 100, the ends of the pins resting on the slides 99 and exerting a pressure thereon owing to the springs 109. The mutilated gear 107 of the crank shaft 103 is so set relatively to the drum gear 108 that during the calculating operation the gear 108 can rotate before the toothless part of the gear 107. The length of the toothed arc is so selected that on the rotation of the gear 107 the row of figures printed on the paper ribbon by the advance of the printing drum is fed forward until it has passed the figures of the numeral disks 34ª, standing ready to print, wherefore the result of the calculation is printed behind the problem to be calculated. The cams 106 which cause printing of the result occupy a position relatively to the gear 107, which admits of the printing of the result during the interval in which the toothless part of the gear 107 is passing the drum gear 108.

The manner of using and the operation of the machine are as follows: Supposing the machine to be in the zero position, as shown in Fig. 1 and it is desired to perform an addition. The keys in the first row, corresponding to the numbers of the first term of the sum, are depressed and thereupon the shaft $a$ given one complete turn toward the right by means of the crank $a_1$. In this manner the whole of the numbers of the said first term are transferred to the counting mechanism and are exhibited in the windows 38 above, as already described with respect to the key 4. Those keys which have not been depressed, will, during the rotation of the crank, have been locked in the elevated position by the plate 29, with the aid of the lever 30 and the disk 31, while the depressed keys on release of the holding devices all return to the middle position (Fig. 1ª) and on completion of the crank rotation again ascend into the elevated position, the spring actuated plate 29 releasing them. The second term of the sum is now set, and the shaft $a$ again given one complete rotation to-ward the right; and the same procedure followed for all further terms, whereupon the total sum can be read off in the windows 38. For performing a subtraction the key mechanism is manipulated in the same manner, except that, as already explained in the earlier part of the specification, the shaft must be turned toward the left. The minuend must previously be transferred to the indicating mechanism by rotation toward the right. For performing a multiplication, the machine being in the zero position, the multiplicand is set in the key mechanism in the same manner as the term of the sum in addition. Thereupon the key 52 (Figs. 10 and 11) is depressed, or the lever 64 (Figs. 7 and 8) set to multiplication. In this manner the bar 26 has received the requisite position for free rotation of the setting wheels drum. The non-depressed keys are locked by the plate 29 and the released keys are retained in the intermediate position by said plate. If now the crank $a_1$ is turned to the right as many times as the multiplier has figures in the units place, the transference of the units-sum to the indicating mechanism proceeds as continued addition. On disengagement of the bar 26 the tooth 73 comes into the operative position and the rotations indicating mechanism thus actuated. Thereupon the key and setting mechanism, as already mentioned, are so far shifted that the tooth 73 comes into the tens place of the rotations counting mechanism, whereupon the rotations for the tens place of the multiplier are made. For the following places of the multiplier the manipulations already described must be undertaken. The result is then visible in the windows 38, while the multiplier can be read off in the windows 88. Key and setting mechanisms are returned into the zero position by the key 55 being depressed, or the lever 64 returned to addition and the crank $a_1$ again turned. In performing a division the key mechanism is manipulated in the same manner as for a multiplication, except that the main shaft is turned toward the left and the division performed as a continued subtraction. The dividend is first transferred to the indicating mechanism in the same manner as the term of the sum in an addition. After completion of the operation the quotient is exhibited in the windows 89 and the remainder in the windows 38.

The manner in which the printing mechanism operates during the performance of the various kinds of calculations, will be clear from the general description already given.

Having thus described our invention, what we claim as new and desire to secure by Letters Patent is:—

1. In a calculating machine, a main shaft, a plurality of setting wheels on the shaft, radially sliding teeth for each wheel, a ring rotatable on each wheel and having a teeth-engaging cam having two diametrically opposite depressed quarters, projections on each ring, keys for each wheel adapted to engage some of said projections for arresting the rotation of the ring, means for automatically locking the keys in depressed position, means for automatically unlocking the same during continued rotation of the main shaft, a sliding bar adapted to engage some of said projections on the ring and rotate the same to retract the teeth and counting and indicating mechanism actuated by said teeth.

2. In a calculating machine, a main shaft, a plurality of setting wheels on the shaft, radially sliding teeth for each wheel, a ring rotatable on each wheel and having a cam groove engaged by the teeth, said cam groove having two diametrically opposed tooth-retracting portions, two pairs of projections on each ring, keys adapted for engagement of one pair of said projections, means for locking and unlocking the keys, a sliding bar having noses engaged by the other pair of projections on the ring to rotate the latter and retract the teeth, means for throwing said bar out of action, and counting and indicating mechanism actuated by said teeth.

3. In a calculating machine, a main shaft, a plurality of setting wheels on the shaft, radially sliding teeth on each wheel, counting and indicating mechanism actuated by said teeth, a ring rotatable on each wheel, rotations indicating mechanism connecting means for the rotations indicating mechanism comprising a driving tooth with gear and a lever actuated by said sliding bar for moving the tooth into and out of operative position.

4. In a calculating machine, a main shaft, a plurality of setting wheels on the shaft, radially sliding teeth on each wheel, counting and indicating mechanism actuated by said teeth, a ring rotatable on each wheel for setting the teeth, rotations indicating mechanism, actuating mechanism for the rotations indicating mechanism, and a releasing lever actuated by said sliding bar for throwing said actuating mechanism into and out of operation.

5. In a calculating machine, a main shaft, a plurality of setting wheels on the shaft, radially sliding teeth for each wheel, a ring rotatable on each wheel and having a cam groove engaged by the teeth, said cam groove having two diametrically opposed tooth-retracting portions, two pairs of projections on each ring, keys adapted for engagement of one pair of said projections, a sliding bar having noses engaged by the other pair of projections on the ring to rotate the latter and retract the teeth, means for throwing said bar out of action, and counting and indicating mechanism actuated by said teeth, a perforated sliding plate through which the keys pass and in which they are locked in upper and intermediate positions and connecting means between said plate and said counting and indicating mechanism for throwing said bar out of action, whereby in multiplying or dividing the released keys can be retained in said intermediate position.

6. In a calculating machine, a main shaft, a plurality of setting wheels on the shaft, radially sliding teeth for each wheel, a ring rotatable on each wheel and having a cam groove engaged by the teeth and having two diametrically opposed tooth retracting portions, two pairs of projections on each ring, keys adapted for engagement of one pair of said projections, means for locking and unlocking the keys, a sliding bar having noses engaged by the other pair of projections on the ring to rotate the latter and retract the teeth, means for throwing said bar out of action, and counting and indicating mechanism actuated by said teeth, in combination with printing mechanism, comprising type segments secured to said grooved rings, a printing drum in front of same, numeral disks mounted above the drum and gearing with the indicating mechanism, and means for pressing the printing drum against the type segments and numeral disks whereby the impressions of the types can be made upon a paper ribbon.

In testimony whereof we have hereunto set our hands in the presence of two subscribing witnesses.

ALEXANDER BOLLINGER.
  ALCIDE LANDRY.
  EUGEN LANDRY.

Witnesses:
 L. H. Munier,
 F. Vullier.